United States Patent [19]
Beynon

[11] 3,921,363
[45] Nov. 25, 1975

[54] CROSS MEMBER WITH END CONNECTOR
[75] Inventor: John O. Beynon, Waterloo, Canada
[73] Assignee: Preston Metal and Roofing Products Limited, Cambridge, Canada
[22] Filed: May 17, 1974
[21] Appl. No.: 470,994

[52] U.S. Cl. .............................. 52/758 A; 403/347
[51] Int. Cl.² ............................................ F16B 7/00
[58] Field of Search .................. 403/347, 382, 403; 52/758 A, 667, 665

[56] References Cited
UNITED STATES PATENTS

| | | | |
|---|---|---|---|
| 3,084,401 | 4/1963 | Findlay | 52/667 X |
| 3,221,466 | 12/1965 | Downing et al. | 52/758 A X |
| 3,501,185 | 3/1970 | Brown et al. | 52/758 A |
| 3,511,012 | 5/1970 | Brady | 52/667 |
| 3,746,379 | 7/1973 | Sauer | 52/667 X |

*Primary Examiner*—Werner H. Schroeder
*Assistant Examiner*—Wayne L. Shedd

[57] ABSTRACT

A cross member has connecting means at each end thereof for spanning and inter-connecting spaced parallel longitudinal main members provided with slots therethrough to receive the cross member end connecting means. The cross member has a planar web and each of the end connecting means comprises a generally planar tongue offset to one side and parallel to the plane and projecting beyond the end of the web. The free end of the tongue comprises a locking portion adapted to be inserted into a main member slot. Outstanding stop lug means are provided on the tongue to limit slot penetration of the locking tongue portion. Also a barb is provided projecting from the plane of the locking tongue portion towards the plane of the web and located forwardly of the stop lug means and presenting a locking shoulder facing away from the free end of the tongue adjacent to the stop lug means and disposed to lie within a slot in a main member in position for inter-engagement with a corresponding shoulder on a corresponding tongue locking portion inserted into the slot from the opposite side of the main member when the locking tongue portion is penetrated therein as limited by the stop lug means. The connecting means on one end of the cross member is offset to the opposite side of the plane of the web from the connecting means at the other end.

22 Claims, 8 Drawing Figures

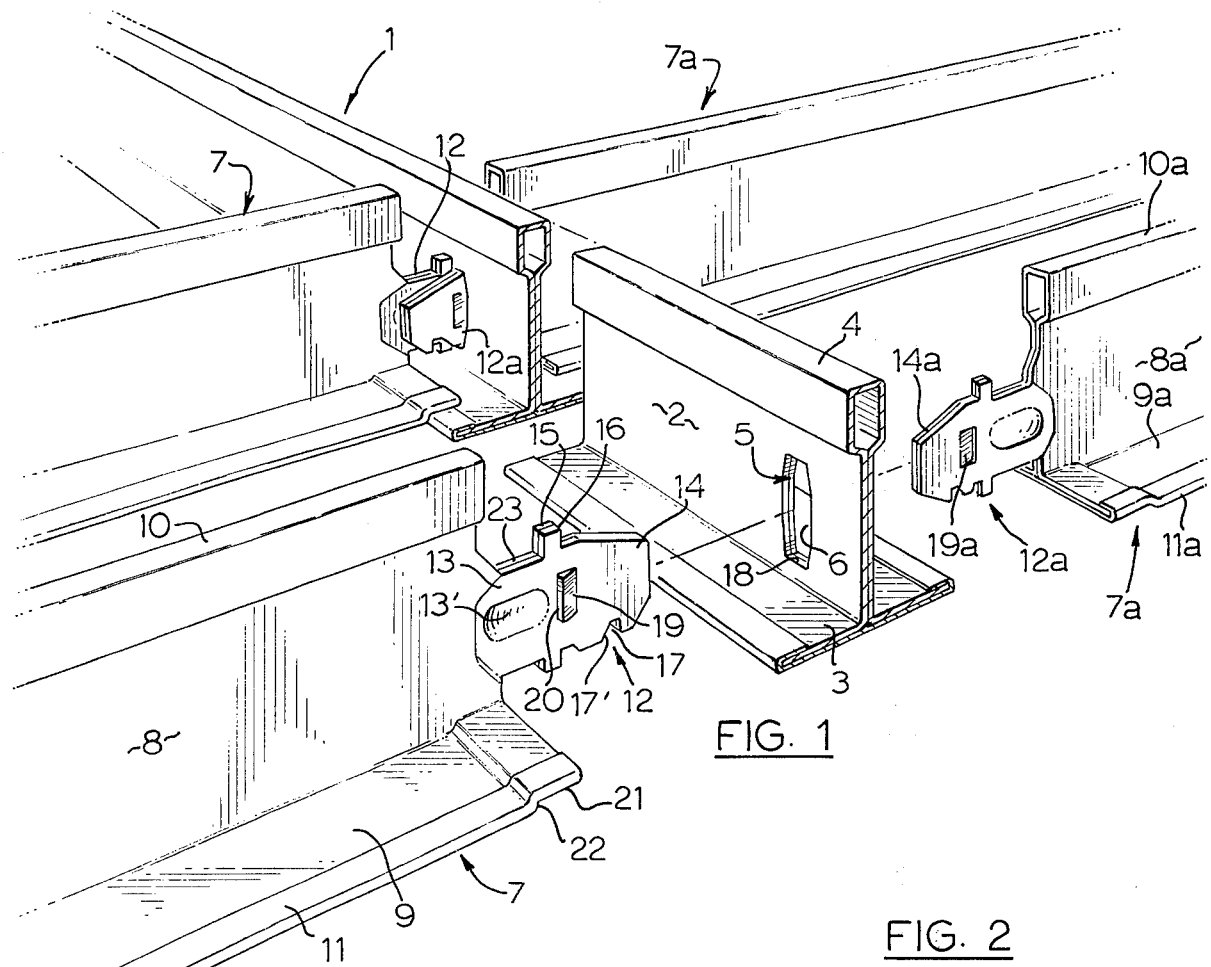
FIG. 1
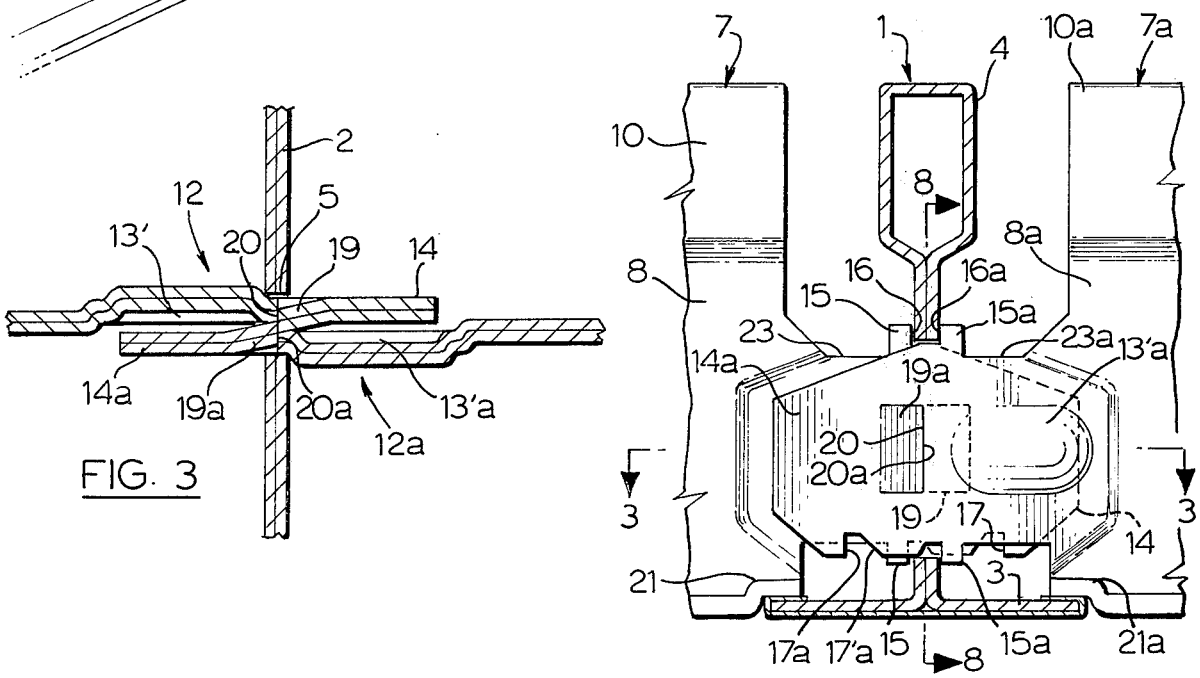
FIG. 3
FIG. 2

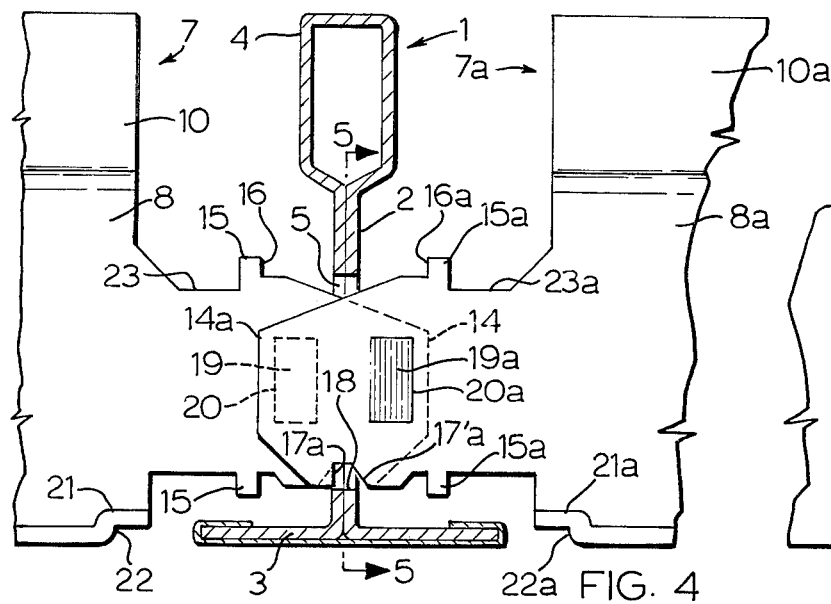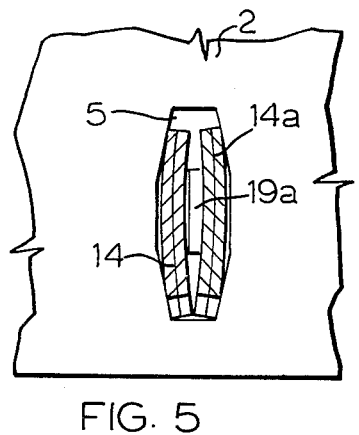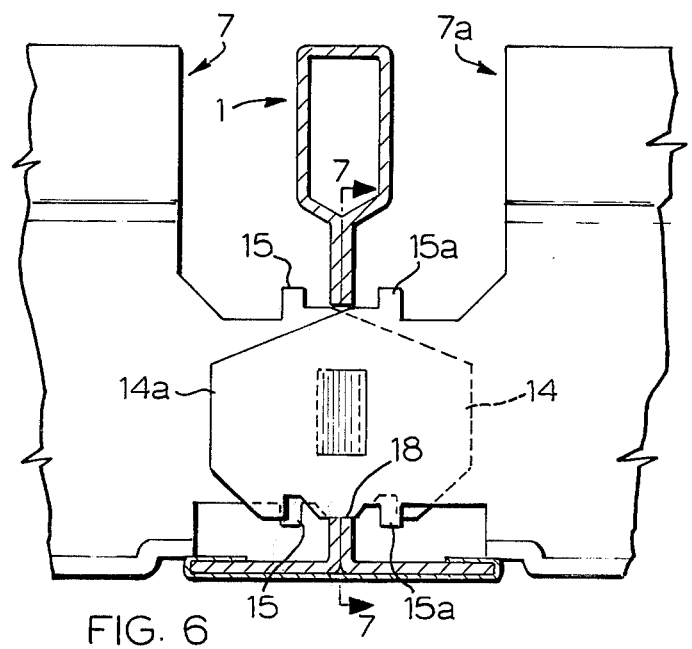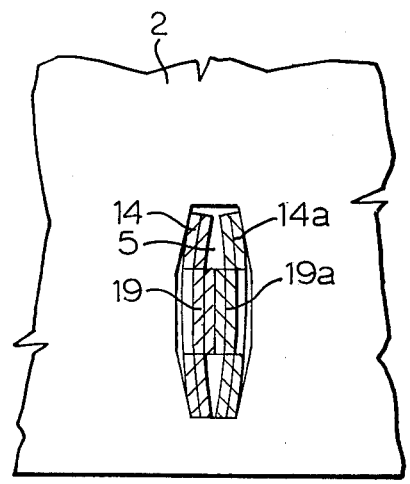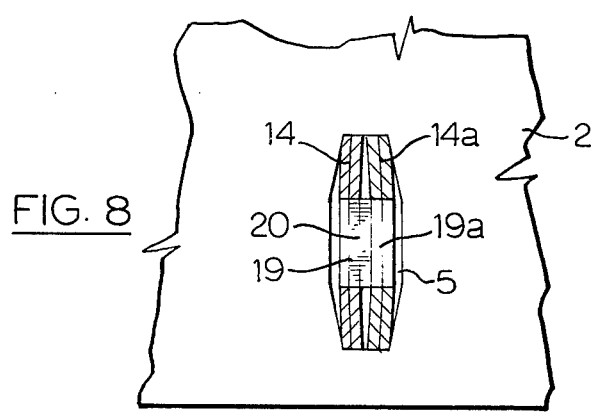

CROSS MEMBER WITH END CONNECTOR

This invention relates to improvements in the inter connections between the main structural members and their inter connecting cross connector members, for example, such as used in forming a grid work for suspended ceilings and the like and the cross connector members providing such inter-connections.

BACKGROUND OF THE INVENTION

In grid systems, for example, suspended ceiling grids, it is important to have the cross connector beams which engage in shared transverse slots formed in the main beam and extend outwardly from opposite sides thereof in as accurate alignment as possible, not only for aesthetic purposes, but also to provide a uniform grid which will uniformly support all of the ceiling tiles. It is also important that the cross connector beams be as readily installed as possible yet provide a positive interlock with the main beams which will not come apart during installation of the grid and ceiling and which will also not twist, buckle or sag when the grid is subject to extreme heat. In this connection, as is well known, it is highly important that during a fire, the ceiling panels be supported as long as possible to provide a fire barrier so that the ceiling grid must be capable of telescoping in directions longitudinally of the beams as uniformly as possible under longitudinal expansion of the beams due to heat.

Where the beams are out of longitudinal alignment, then even if the beams incorporate some provision internally to accept longitudinal telescoping, the beam connections are subject to excessive stress and tend to buckle before the beams telescope allowing beam shifting and dropping of the ceiling tiles.

Also, because of the limited clearance space in many ceiling installations, it is almost impossible to bring the interlocking cross beams into position in a strictly horizontal position as presently required in many interlocking ceiling grid structures, rendering such installations extremely difficult. Again, present installations frequently provide unsightly spaces between connected beam members which is highly undersirable. Still further, frequently the cross beams are accidentally interlocked with the main beam in an out of line relation and they cannot be removed for correct interlock without destruction of the connectors.

It is the object of this invention to provide a cross connector-main structural member interlock system and a cross connector member therefor in which the cross members extending on opposite sides of the main member when interlocked therewith are precisely aligned.

Another important object is to provide a connection arrangement as aforesaid in which the cross members cannot be improperly interlocked with the main member in an out-of-line position.

Again, it is an object of the invention to provide a connection arrangement as aforesaid and a cross connector member therefor which can be easily accomplished with the cross members being able to be temporarily hooked in position in the main member slots from below and then pushed into positive interlocked relation to provide an inter-connection secure from accidental uncoupling.

Again, it is an object to provide an inter-connection between the cross members in the main member slot which will not buckle or twist under stress and will not shift realtive to the main member.

Still a further object is to provide for telescoping of the cross member inter-connector under cross member expansion due to heat in a manner which will not disturb the accurate cross member alignment.

Still again it is an object to provide a cross member having the ability to provide the aforesaid inter-connection features which member will be of relative simple construction and will have the end connector formed integral therewith.

SUMMARY OF THE INVENTION

According to the present invention, there is provided a cross member having connecting means at each end thereof for spanning and inter-connecting spaced parallel longitudinal main members provided with slots therethrough to receive and be shared by the cross member end connecting means of cross members extending from opposite sides of the main beam. The cross member further has a planar web and each of the end connecting means comprises a generally planar tongue offset to one side and parallel to the plane and projecting beyond the end of said web. The free end of the tongue comprises a locking portion adapted to be inserted into a main member slot and has outstanding stop lug means formed thereon to limit slot penetration of the locking tongue portion. This locking tongue portion further has a barb projecting from the plane of the web and located forwardly of the stop lug means with the barb presenting a locking shoulder facing away from the free end of the tongue adjacent to the stop lug means, the arrangement being such that the locking shoulder is disposed to lie within a slot in a main member in position for inter-engagement with a corresponding shoulder on a corresponding tongue locking portion inserted into the slot from the opposite side of the main member when the locking tongue portion is penetrated therein as limited by the stop lug means. While the connecting means at both ends of the cross member are of corresponding structure, they are offset on opposite sides of the plane of the web.

The members with which the invention is normally concerned are inverted T's with both the cross connector members (cross T's) and the main members (T's) having planar vertical webs, bottom flanges projecting laterally on each side of the web and, usually, reinforcing top ribs.

Preferably the tongue at each end of the cross T is offset from the plane of the web by half the thickness of the web and the free end portion of the tongue outwardly of the stop lug means has a measure of resilient deformability and the portion of the tongue inwardly of the stop lug means constituting the tongue root is relatively rigid.

Preferably further the tongue locking portion is tapered at its free end and has a hooked end for temporarily hanging the cross T from the main T slot.

Also preferably the root of the tongue is provided with a longitudinal rib located inwardly of the locking shoulder and projecting away from the plane of the web.

Also preferably the stop lug means on the tongue are the sole means limiting insertion of substantially the full length of said tongue into a main T slot, and the lug means are adapted to shear under cross beam expansion due to heat.

Again, preferably the aperture of the main T to be shared by opposing locking tongues of cross T's on opposite sides of the main T is shaped to be wider adjacent its central portion than at its ends to accommodate deformation of the locking portions of the tongues to allow the barb locking shoulder to ride over each other into position to snap lock behind each other.

These and other objects and features will become apparent from the following detailed description taken in conjunction with the accompanying drawings.

BRIEF DESCRIPTION OF THE DRAWINGS

FIG. 1 is a broken away perspective view of a main T with which one set of cross T's are interlocked and a second set is about to be interlocked in the main T aperture.

FIG. 2 is a vertical section taken transverse the main T one of the locking apertures and showing the cross T connectors interlocked therewith.

FIG. 3 is a sectional view taken on the line 3—3 of FIG. 2.

FIG. 4 is a part-vertical sectional part-elevational illustrating the locking portion of the cross T tongues moving through the main T aperture preparatory to effecting interlock.

FIG. 5 is a sectional view taken on the line 5—5 of FIG. 4.

FIG. 6 is a view similar to FIG. 4 but with the locking portion of the cross T tongues being further advanced towards the locked position.

FIG. 7 is a view on the line 7—7 of FIG. 6.

FIG. 8 is a sectional view taken on the line 8—8 of FIG. 2 after the cross T locking tongue portions have interlocked and are fixed in the main T slot.

DETAILED DESCRIPTION OF THE DRAWINGS

With reference first to FIG. 1, there is illustrated a main T beam 1, usually referred to as a main T, which may, for example, be of a construction as more particularly described in my co-pending application Ser. No. 470,721. In any event, this main T 1 has a vertical web 2, a bottom flange 3 extending on opposite sides of the vertical web, and a rolled top reinforcing rib 4. The main T 1 is provided at appropriate intervals with vertical slots or apertures 5 which preferably are shaped so that they are wider at their central portion 6 than at their ends for a purpose as will hereinafter appear.

Connected or about to be connected with the main T 1, as illustrated in FIG. 1, are four T beams, usually referred to as cross cross T's, of identical construction with the cross T's on the left hand side of the main T being designated generally by the number 7 and the cross T's on the right hand side being designated by the number 7a. It will be understood that cross T's 7 and 7a correspond and like parts on cross T 7a will be designated by the letter "a".

Cross T 7 like the main T 1 has a vertical web 8, bottom flange 9 extending on opposite sides of the web 8 and a rolled reinforcing bead or rib 10 along its upper edge. The cross T may be rolled from a single sheet of metal to provide a double thickness of metal throughout the vertical web 8 and a pair of laterally spread wings at the bottom forming the bottom flange 9 which may be covered with a cap 11. The upper rib 10 is of hollow construction.

The cross T 7 is provided at each end with a locking connector generally designated at 12 and comprising a tongue integral with the web 8 and projecting forwardly therefrom.

The tongue 12 is of generally planar configuration and is offset to one side of the plane of the web 8 but parallel thereto. In the case of the tongue 12 shown on cross T 7 in FIG. 1, the plane of the tongue is displaced rearwardly of the plane of the web 8.

While the opposite end of the cross T 7 will have a corresponding connector or tongue 12, this will be disposed on the opposite side of the plane of the web 8, that is, on the near side, and such a locking connector or tongue appears as connector or tongue 12a on cross T 7a.

The tongue 12 has a relatively rigid root or base portion 13 connected with the web 8 and a somewhat flexible free end locking portion 14 projecting forwardly from the root portion 13. Between or at the juncture of the tongue portions 13 and 14 are vertically projecting lugs 15 which provide locking shoulders 16 to limit penetration of the tongue 12 into one of the slots 5 to the depth of the free end locking portion 14. These locking shoulders 16 stand proud and are the sole means to prevent full penetration of the tongue 12 and they are adapted to shear under excessive endwise force on the cross T as, for example, under the heat of a fire, to allow further tongue penetration into the aperture 5, as hereinafter more fully explained.

The tongue portion 14 is tapered towards its free end and is provided on its underside with a notch 17 in effect constituting the free end tongue portion 14 as a hook, which is adapted to be hooked onto the bottom edge 18 of the slot 5. Behind the notch 17 is provided a cam surface 17' for a purpose which will hereinafter appear.

The root portion 13 of the tongue is stiffened by means of a rib 13' formed therefrom which projects laterally away from the plane of the cross T web 8 so that it will provide no interference in the interlocking action. On the other hand, the relatively resilient locking tongue portion 14 has a detent or barb 19 struck therefrom and projecting towards the plane of the cross T web. The offset of the plane of the tongue generally is one half the thickness of the cross T web 8 and the detent is returned at least to the plane of the web and is formed to present a locking shoulder 20 facing towards the tongue root 13.

This locking shoulder 20 is spaced slightly forwardly towards the free end of the tongue relative to the locking lugs 15 so that when the locking tongue portion 14 is inserted into the slot 5, to the point limited by the lugs 15, the locking shoulder 20 will lie almost immediately at but slightly past the mid point of the slot in a position to co-operate and interlock with a mating locking shoulder 20a as hereinafter more fully described.

The bottom flange 9 of the cross T is turned upwardly and forwardly at the end to provide a seating lip 21 which is adapted to overlap and seat on the main T flange 3. The under corner 22 of the lip 21 is not precisely sharp so that under cross beam expansion the flange 9 can ride up over the flange 3 without jamming.

With reference to FIGS. 4 to 8 and FIG. 2, the interlock that can be effected between the cross T's and the main T will be more fully understood. In this connection, FIG. 4 illustrates the opposing locking tongues 12 and 12a which are offset on opposite sides of the what is now the common plane of the cross T's 7 and 7a. Partially inserted into the slot or aperture 5 at this point, as shown particularly in FIG. 5, the detents or locking barbs 19 and 19a are tending to separate the locking tongue portions 14 and 14a and the provision of the wider central portion 6 of the slot 5 accommodates a slight bowing of the free locking tongue portion 14 out of their planar configuration. The detents or barbs 19 and 19a are as shown in FIG. 3 positioned inwardly of tongue 12 at least to the plane of the cross T webs and may, if desired, project slightly beyond the plane of web 8. These barbs may themselves have some resiliency and the bowing of the locking tongue portions 14 that occurs will depend upon the relative resiliency of the barb 19 and the respective tongue portions, as well as the extent of the projection of the barb 19. FIG. 6 shows the tongue portions 14 further advanced so that the barbs 19 and 19a are in interference with each other, further bowing the tongue portions 14 and 14a as well as pressing the barbs inwardly. FIGS. 2 and 8 show the final locking position in which the lugs 15 and 15a provide stops limiting further inward movement of the tongue portions 14 and 14a, respectively, and by this time the barbs or detents 19 and 19a will have ridden over each other, allowing the tongue portions 14 and 14a to recover to their planar configurations and the barbs 19 and 19a to return outwardly from any inward displacement they may have had to snap lock the locking shoulders 20 and 20a behind each other. Thus, the interlock of the shoulders 20 and 20a prevents accidental pulling apart of the cross T's 7 and 7a while the locking lugs 15 and 15a engaging on opposite sides of the web 2 of the main T 1 prevent further inward advancement of the tongues 12 and 12a and also form locating means centering the interlocked shoulders 20 essentially on the center line of the main T web or centrally of the slot 5. During the movement towards locking position, it will be appreciated that the cam surfaces 17' and 17'a will vertically lift the cross T's to lift the lips 21 and 21a over the main T bottom flange 3 so that no interference between these lips and the main T flange occurs even though the cross T's are simply pushed horizontally into the locking position.

Because of the taper of the locking tongue portion 14, and also because of the hook formation provided by the notch 17, and the provision of the cam surfaces 17' and 17'a as discussed above, the cross T 7 can initially be temporarily hooked into position from a horizontal direction without requiring any clearance thereabove by engagement with the bottom 18 of the slot 5 and the T can subsequently simply be pushed horizontally into the locked position, at which point the width of the tongue portion 14 is substantially equal to the heighth of the slot 5. The root portion 13 of the tongue is slightly reduced as at 23 so that when, as explained, a fire occurs and the cross T's are subject to excessive expansion under heat, the lugs 15 standing proud are readily sheared under such excessive force and the root portion 13 of the tongue can be advanced into the slot 5, the reduced dimension of this root portion permitting the cross T flange 9 to ride up onto the main T flange without jamming. The length of the tongue root portion 13 is chosen to accommodate the required permissable beam elongation to meet the fire rating regulations.

It will be understood that by having the tongues 12 and 12a offset oppositely one half the thickness of the web of the cross T's, they will, when located in face to face contact in the slot 5 in the locked position, effect the precise longitudinal alignment of the opposing cross T's and jointly they will provide a connection which is not under any bending or other undue stress but will provide a strong flat contact abutment area resisting twisting and the provision for the telescopic collapse of the joint by shearing of the lugs 15 will preclude unwanted buckling of the joint. Further, the support provided by the inter-engagement of the cross T lips 21 and the main T flange 3 provides support against cross T sagging or excessive vertical stress on the interconnection. Another important feature of the provision of the enlargement 6 of the slot 5 in addition to allowing the tongue portions 14 and 14a to bow during the locking action is that it precludes interlocking of the cross T's in an out-of-line relationship. That is, if the tongue portions 14 and 14a are inserted into the slot 5 with the planes of the cross beams 7 and 7a out of alignment and the central barbs 19 and 19a facing outwardly and away from the center line of the slot, these barbs will simply pass harmless through the enlarged slot portion 6 without effecting any interlock at all. Once the fact that interlock has not been achieved is noted, it will be apparent to the installer that the cross T's are out of alignment and he can simply withdraw the tongue portions 14 and 14a and re-insert them correctly with the barbs facing inwardly towards the center line of the slot.

While the preferred embodiment of the invention has been particularly described, with respect to a cross connector of T section, it will be understood that the invention is obviously applicable to any beam or structural member having a planar web portion and adapted to be connected to a main structure member through the use of a shared slot. It will be understood that variations in detail may be made without departing from the spirit of the invention or scope of the appended claims.

I claim:

1. A cross member having a connecting means at an end thereof for interconnecting said cross member to a longitudinal main member provided with vertical slots therethrough which slots at their ends are of a width to snugly receive a pair of opposing such connecting means and which are of a greater width away from their ends to permit the opposite bowing of such connecting means, said cross member having a vertically disposed planar web; each of said connecting means comprising a generally planar tongue offset to one side and parallel to the plane of and projecting beyond the end of said web; said tongue having outstanding stop lug means formed thereon to limit slot penetration and having a barb located forwardly of said stop lug means and presenting an inclined camming surface projecting from the plane of said tongue towards the plane of said web and increasing in height away from the free end of the tongue and terminating in a locking shoulder facing away from the free end of said tongue and disposed relative to said stop lug means so that with said stop lug means in slot penetration limiting position said shoulder lies within a slot in a main member in position for inter-locking engagement with a corresponding locking shoulder on a corresponding barb of a corresponding tongue inserted into the slot from the opposite side of the main member, said tongue at least forwardly of said stop lug means being adapted to resiliently bow out of its vertical planar configuration to enable said barb to be displaced laterally relative to the top and bottom edges of the tongue outwardly away from the plane of said cross member web; the arrangement being such that when opposing tongues of corresponding cross members are inserted into a main member slot from opposite sides thereof, each tongue between its top and bottom edges is adapted to bow outwardly under mutual contact of the opposing barb camming surfaces away from the plane of the web of the respective cross member and away from the opposing tongue as permitted by the wider portion of the slot while the end portions of the slot hold the top and bottom edges of the opposing tongues in contiguous face to face relation until the tongues penetrate the slot to an extent limited by the respective stop lug means at which point the opposing tongue barbs have passed by one another permitting the respective tongues to resiliently recover from the bowing thereof whereupon they spring back towards their normal positions to bring the respective locking shoulders into facing interlocked relation to coact with the stop lug means to lock the respective tongues in the slot.

2. A cross member as claimed in claim 1 in which the tongue of each of said connecting means is tapered at its free end.

3. A cross member as claimed in claim 1 in which the tongue of each of said connecting means has a hooked end for temporarily holding the cross beam in a main member slot.

4. A cross member as claimed in claim 1 in which the tongue of each of said connecting means is provided with a longitudinal rib located rearwardly of said stop lug means and projecting away from the plane of the web.

5. A cross member as claimed in claim 1 in which said stop lug means are the sole means limiting insertion of substantially the full length of said tongue into a main member slot, and said lug means are adapted to shear under cross member expansion due to heat.

6. A cross member of claim 1 wherein said barb camming surface is a broad rectangular shaped inclined surface which camingly engages a corresponding broad rectangular shaped inclined surface of a corresponding barb when the barbs ride up over each other as the respective opposing tongues of the cross members are inserted in a slot of a main member.

7. A cross member of claim 1 wherein said tongue is planar on its side facing away from said barb.

8. A cross T beam having connecting means at each end thereof for spanning and interconnecting spaced parallel main T members provided with slots therethrough which slots at their ends are of a width to snugly receive a pair of opposing such connecting means and which are of a greater width away from their ends to permit the opposite bowing of such connecting means, said cross T having a vertical planar web portion, a top reinforcing bead and a bottom flange extending on opposite sides of said planar web portion, and each of said end connecting means comprising a vertical generally planar tongue integral with said web and projecting endwise beyond the end of said web, bead and flange, said tongue being offset to one said of and parallel to the plane of said web and having a relatively rigid root portion, and projecting stop lug means adjacent said rigid root portion to normally limit tongue penetration into a main T slot, said tongue having a barb presenting an inclined camming surface projecting from the plane of the tongue in a direction towards the plane of said web, said barb presenting at the end of said camming surface a locking shoulder facing away from the free end of the tongue and adjacent to said stop lug means and disposed with said stop lug means in slot penetration limiting position to lie within a slot in a main T in position for interlocking engagement with a corresponding locking shoulder on a corresponding barb of a corresponding tongue inserted into the slot from the opposite side of the main T; said tongue at least forwardly of said stop lug means being adapted to resiliently bow out of its vertical planar configuration to enable said barb to be displaced laterally relative to the top and bottom edges of the tongue outwardly away from the plane of said cross-T web; the arrangement being such that when opposing tongues of corresponding cross T's are inserted into a main T slot from opposite sides thereof each tongue between its top and bottom edges is adapted to bow outwardly under mutual contact of the opposing barb camming surfaces away from the plane of the web of the respective cross T and away from the opposing tongue as permitted by the wider portion of the slot while the end portions of the slot hold the top and bottom edges of the opposing tongues in contiguous face to face relation as the inclined surfaces of the respective barbs contact and ride up over one another as the barbs pass by each other until the tongues penetrate the slot to an extent limited by the respective stop lug means at which point the opposing tongue barbs have passed by one another permitting the respective tongues to resiliently recover from the bowing thereof whereupon they spring back towards their normal positions to bring the respective locking shoulders into facing interlocked relation to coact with the stop lug means to lock the respective tongues in the slot; the connecting means on one end of the cross T being offset to the opposite side of the plane of the web from the connecting means at the other end.

9. A cross T as claimed in claim 8 in which said tongue is offset to one side of the plane of the web by substantially half the thickness of the web.

10. A cross T as claimed in claim 8 in which the end of said flange is formed upwardly and forwardly to present a transverse mounting lip adapted to overlie the flange of a main T beam.

11. A cross T as claimed in claim 8 (amended) in which said tongue has a hook for temporarily hooking the cross T into a main T slot.

12. A cross T as claimed in claim 8 in which said lug means are frangible under shear and said root tongue portion is adapted to enter a main T slot upon shear of said lug means.

13. A cross T as claimed in claim 8 in which said root tongue portion is provided with a reinforcing rib projecting from the side thereof away from the plane of said web.

14. A cross T as claimed in claim 8 (amended) in which said free end slot penetrating locking tongue portion is provided with a cam surface on the underside thereof which engages the bottom of the slot to lift said cross T when the free end slot penetrating locking tongue portion is inserted into the main T slot to clear said cross T and bottom flange from interference with the main T flange.

15. A cross T of claim 8 (twice amended) wherein said barb camming surface is a broad rectangular shaped inclined surface which camingly engages a corresponding broad rectangular shaped inclined surface of a corresponding barb when the barbs ride up over each other as the respective opposing free end slot penetrating locking portions of the cross members are inserted in a slot of a main member.

16. A cross T beam-main T beam interlocking combination comprising a main T having a bottom flange, a planar vertical web, and a top rib, said vertical web having a plurality of vertically extending slots therethrough, and a pair of cross T's each comprising a bottom flange, a planar vertical web and a top rib, each of said cross T's having an integral end connector for introduction into said main T slot and for co-operation with each other and said slot to interlock said main and cross T's together with said cross T's extending laterally of said main T on opposite sides thereof and with said cross T's in longitudinal alignment with each other, said slots at their ends being of a width to snugly receive a pair of opposing such connectors and which slots are of a greater width away from their ends to permit the opposite bowing of such end connectors, each of said integral end connectors comprising a generally planar tongue projecting from the end of its respective cross T web parallel to but offset from the plane thereof substantially half the thickness of the web, each of said tongues having a relatively rigid root portion connected to its respective web, outstanding stop lug means adjacent said rigid root portion to limit penetration of the tongues in said slot, said tongue having a centrally disposed barb presenting an inclined camming surface projecting therefrom towards the plane of its respective cross T web, said barb presenting at the end of said camming surface a locking shoulder facing its respective tongue root and located forwardly of the stop lug means towards the free tongue end a distance substantially equal to one half the thickness of the main T web, said locking shoulder being disposed to lie within a slot of said main T in position for interlocking engagement with a corresponding locking shoulder on a corresponding barb of a corresponding tongue inserted into the slot from the opposite side of the main member; the tongues of the cross T's on opposite sides of the main T being offset on opposite sides of the planes of their respective cross T webs, said tongue at least forwardly of said stop lug means being adapted to resiliently bow out of its vertical planar configuration to enable said barb to be displaced laterally relative to the top and bottom edges of the tongue outwardly away from the plane of said cross T web; the arrangement being such that when opposing tongues of corresponding cross T's are inserted into a main T slot from opposite sides thereof each tongue between its top and bottom edges is adapted to bow outwardly under mutual contact of the opposing barb camming surfaces away from the plane of the web of the respective cross T and away from the opposing tongue as permitted by the wider portion of the slot while the end portions of the slot hold the top and bottom edges of the opposing tongues in contiguous face to face relation as the inclined surfaces of the respective barbs contact and ride up over one another as the barbs pass by each other until the tongues penetrate the slot to an extent limited by the respective stop lug means at which point the opposing tongue barbs have passed by one another permitting the respective tongues to resiliently recover from the bowing thereof whereupon they spring back towards their normal positions to bring the respective locking shoulders into facing interlocked relation to coact with the stop lug means to lock the respective tongues in the slot.

17. The combination as claimed in claim 16 in which said stop lug means comprise lugs which stand proud and are adapted to shear under beam expansion to permit movement of the root portions of said tongues into said slots.

18. The combination as claimed in claim 16 in which said barbs are resiliently displaceable towards the planes of the tongues.

19. The combination as claimed in claim 16 in which said tongue portions are tapered towards their free ends and have notches in their bottom edges.

20. The combination as claimed in claim 16 in which said cross T bottom flanges have upwardly offset lips at the end thereof disposed ride on top of the main T bottom flange.

21. The combination as claimed in claim 16 in which said tongue portions have cam surfaces on the undersides thereof for co-operation with the bottom of the main T slot to effect upward camming of said cross T's on movement towards the locking position to clear the cross T bottom flanges from interference with the main T bottom flange.

22. A cross T-main T interlocking combination of claim 16 (twice amended) wherein said barb camming surface is a broad rectangular shaped inclined surface which camingly engages a corresponding broad rectangular shaped inclined surface of a corresponding barb when the barbs ride up over each other as the respective opposing free end slot penetrating locking portions of the cross members are inserted in a slot of a main member.

* * * * *